United States Patent
Guillot et al.

(10) Patent No.: US 12,436,409 B2
(45) Date of Patent: Oct. 7, 2025

(54) LENS ELEMENT

(71) Applicant: ESSILOR INTERNATIONAL, Charenton-le-Pont (FR)

(72) Inventors: Matthieu Guillot, Issy les Moulienaux (FR); Samy Hamlaoui, Paris (FR); Guillaume Giraudet, Orleans (FR); David Rio, Gometz-le-Châtel (FR); Konogan Baranton, Montry (FR)

(73) Assignee: Essilor International, Charenton-le-Pont (FR)

( * ) Notice: Subject to any disclaimer, the term of this patent is extended or adjusted under 35 U.S.C. 154(b) by 403 days.

(21) Appl. No.: 18/189,587

(22) Filed: Mar. 24, 2023

(65) Prior Publication Data
US 2023/0301776 A1 Sep. 28, 2023

(30) Foreign Application Priority Data

Mar. 25, 2022 (EP) .................................... 22315074

(51) Int. Cl.
 *G02C 7/02* (2006.01)
 *A61F 2/16* (2006.01)
(52) U.S. Cl.
 CPC ............ *G02C 7/022* (2013.01); *A61F 2/1618* (2013.01)
(58) Field of Classification Search
 None
 See application file for complete search history.

(56) References Cited

U.S. PATENT DOCUMENTS

| | | | |
|---|---|---|---|
| 10,268,050 | B2 | 4/2019 | To et al. |
| 10,948,744 | B1 | 3/2021 | Guillot et al. |
| 10,962,804 | B1 | 3/2021 | Guillot et al. |
| 2017/0131567 | A1 | 5/2017 | To et al. |
| 2019/0212580 | A1 | 7/2019 | To et al. |
| 2020/0073147 | A1 | 3/2020 | Bakaraju et al. |
| 2020/0159044 | A1 | 5/2020 | To et al. |
| 2020/0393702 | A1 | 12/2020 | Guillot et al. |

(Continued)

FOREIGN PATENT DOCUMENTS

| | | |
|---|---|---|
| EP | 3 640 713 A1 | 4/2020 |
| WO | WO 2005/055891 A1 | 6/2005 |

(Continued)

OTHER PUBLICATIONS

Extended European Search Report Issued Sep. 8, 2022 in European Application 22315074.9 Filed on Mar. 25, 2022, 9 pages.

(Continued)

*Primary Examiner* — Darryl J Collins
(74) *Attorney, Agent, or Firm* — Oblon, McClelland, Maier & Neustadt, L.L.P.

(57) ABSTRACT

A lens element intended to be worn in front of an eye of a wearer including at least a first and a second set of optical elements providing respectively a first and a second optical function. When worn by a wearer, an optical element of the first set is located at a greater distance from the center of rotation of the eye than an optical element of the second set. At least some optical elements of the second set are disposed with respect to the optical elements of the first set of the lens element to provide according to a respective first and a second gaze direction on different zones of the retina of the eye of the wearer distinct cumulative optical effects.

12 Claims, 7 Drawing Sheets

(56) References Cited

U.S. PATENT DOCUMENTS

| | | |
|---|---|---|
| 2020/0409180 A1 | 12/2020 | Guillot et al. |
| 2021/0003864 A1 | 1/2021 | Guillot et al. |
| 2021/0048689 A1 | 2/2021 | Guillot et al. |
| 2021/0109378 A1 | 4/2021 | Guillot et al. |
| 2021/0116720 A1 | 4/2021 | Guillot et al. |
| 2021/0116722 A1 | 4/2021 | Guillot et al. |
| 2021/0199990 A1 | 7/2021 | Guillot et al. |
| 2021/0311330 A1 | 10/2021 | Guillot et al. |
| 2021/0311331 A1 | 10/2021 | Guillot et al. |
| 2021/0354409 A1 | 11/2021 | Guillot et al. |
| 2021/0354410 A1 | 11/2021 | Guillot et al. |
| 2022/0082858 A1 | 3/2022 | Guillot et al. |
| 2022/0082859 A1 | 3/2022 | Guillot et al. |
| 2022/0236589 A1 | 7/2022 | Le Saux et al. |
| 2022/0244567 A1* | 8/2022 | Qi .................... B29D 11/00317 |
| 2023/0273458 A1* | 8/2023 | Qi ............................ G02C 7/06 |
| | | 351/159.74 |
| 2024/0264465 A1* | 8/2024 | Xia ........................ G02C 7/028 |

FOREIGN PATENT DOCUMENTS

| | | |
|---|---|---|
| WO | WO 2018/152595 A1 | 8/2018 |
| WO | WO 2020/245375 A1 | 12/2020 |
| WO | WO 2022/023485 A1 | 2/2022 |

OTHER PUBLICATIONS

Combined Taiwanese Office Action and Search Report issued Jan. 18, 2024 in Taiwanese Patent Application No. 112111145 (with English translation), 11 pages.

* cited by examiner

LENS ELEMENT

CROSS-REFERENCE TO RELATED APPLICATION

The present application claims priority to European Patent Application No. 22315074.9, filed on Mar. 25, 2022. The benefit of priority is claimed to each of the foregoing, and the entire contents of each of the foregoing are incorporated herein by reference.

TECHNICAL FIELD

The present disclosure relates to a lens element intended to be worn in front of an eye of a person in particular to suppress, reduce progression or control abnormal refractions of the eye such as myopia or hyperopia. The lens element is in particular an ophthalmic article.

The term "ophthalmic article" is specifically understood to mean a lens, corrective or otherwise, that can be used as spectacle glass, for spectacles for example, particularly sunglasses, goggles, visors or the like or a contact lens worn by the user in direct contact with his eye.

BACKGROUND OF THE DISCLOSURE

Myopia of an eye is characterized by the fact that the eye focuses distant objects in front of its retina. Hyperopia of an eye is characterized by the fact that the eye focuses distant objects behind its retina. Myopia is usually corrected using a concave lens and hyperopia is usually corrected using a convex lens.

It has been observed that some individuals when corrected, using conventional single vision optical lenses, in particular children, focus inaccurately when they observe an object which is situated at a short distance away, that is to say, in near vision conditions. This is in particular more often the case nowadays with smartphones that children are confronted with and using already in their youngest childhood. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individuals the myopia defect tends to increase over time.

Foveal vision corresponds to viewing conditions for which the image of an object looked at is formed by the eye in the central zone of the retina, called the foveal zone.

Peripheral vision corresponds to the perception of elements of a scene that are offset laterally relative to the object looked at, the images of said elements being formed on the peripheral portion of the retina, away from the foveal zone.

The ophthalmic correction with which an ametropic subject is provided is usually adapted for his foveal vision. However, as is known, the correction has to be reduced for the peripheral vision relative to the correction that is determined for the foveal vision. In particular, studies carried out on monkeys have shown that focusing the light far behind the peripheral retina, even with simultaneous light perfectly focused on the fovea, causes the eye to elongate and therefore causes a myopia defect to increase.

Therefore, it appears that there is a need for a lens element that would suppress, control or at least slow down progression of abnormal refractions of the eye such as myopia or hyperopia.

WO2019206569 in the name of the applicant proposes solutions by disclosing lens elements having optical elements which show in particular a focus shifting leading to a function of non-focusing an image on the peripheral retina of the eye in standard wearing conditions.

The present disclosure aims to provide further functions at least under certain circumstances, in particular depending on the gaze direction.

SUMMARY OF THE DISCLOSURE

In order to achieve this goal, the present disclosure proposes a lens element intended to be worn in front of an eye of a wearer comprising at least a first and a second set of optical elements providing respectively a first and a second optical function, wherein when worn by a wearer, an optical element of the first set is located at a greater distance from the centre of rotation of the eye than an optical element of the second set, wherein at least some optical elements of the second set are disposed with respect to the optical elements of the first set of the lens element to provide according to a respective first and a second gaze direction on different zones of the retina of the eye of the wearer distinct cumulative optical effects:

contribution to a focus shift on transmitted light to peripheral zones of the retina of the eye of the wearer according to a first gaze direction, and at least partly or completely counter focus shift a focus shift induced by the first optical function of the optical elements of the first set in the central zone of the retina of the wearer according to a second gaze direction different from the first gaze direction.

Due to the distinct cumulative optical effects, myopia control efficiency is improved for a first gaze direction because of a cumulative cooperative interaction of both sets of optical elements enhancing defocusing and in particular visual acuity can be improved for a second gaze angle, because of a cumulative cooperative interaction of both sets of optical elements neutralizing each other at least partly with respect to defocusing.

Thus for different gaze directions, at least some of the optical elements of the second set will cooperate differently with the optical elements of the first set, providing thus supplemental functionalities for a lens element depending on the gaze direction.

Viewing according to a first gaze direction allows formation of a blurred/defocused image on the peripheral zone of the retina of the wearer. The focus of the lens element is negative shifted to be located upstream of the retina and closer to the rear face/back face of the lens element.

Viewing according to the second gaze direction allows formation of an image with improved sharpness in the foveal zone of the retina.

According to further aspects taken alone or in combination relating to the above defined lens element or the above defined method:

The projections of the first and second sets of optical elements on the entrance pupil appear as independent domains at the first gaze direction, and as contiguous or overlapping at the second gaze direction.

The first gaze direction presents a gaze angle in particular comprised between +/−10° which corresponds to far vision.

The second gaze direction presents a gaze angle in particular comprised between −40° and −20° which corresponds to near vision.

The lens element comprises for example a front refraction area and a rear refraction area cooperating to achieve a refractive power based on a prescription for said eye of the wearer.

The optical elements of the first set may be disposed on a front face of the lens element.

The optical elements of the second set may be disposed on a rear face of the lens element.

The optical elements of either the first or second set, or both may be integrated in an intermediate layer of the lens element.

The optical elements of the first set are for example in recess or in protrusion with regard to the front refraction area.

The optical elements of the second set are for example in recess or in protrusion with regard to the rear refraction area.

The optical elements of the second set may be at least partly ring shaped.

At least some of the optical elements of the second set can be configured to change the gradient law of associated optical elements of the first set in function of lens eccentricity.

The invention also relates to a method for conceiving a lens element intended to be worn by a wearer as described above, where the positions of the second set of optical elements are determined with respect to the centre of rotation of the eye of a wearer.

BRIEF DESCRIPTION OF THE DRAWINGS

Other advantages and features will become apparent upon reading the description of the following figures, among which.

DETAILED DESCRIPTION

On all the figures, the same elements bear the same reference numbers.

The following embodiments are only examples. Although the description refers to one or several embodiments, the invention is not limited to these embodiments. In addition, a feature described in relationship with one embodiment may also concern another embodiment even if this is not mentioned expressively. Simple features of different embodiments may also be combined to provide further realizations.

In the present description, by "front" or "rear" face of a layer or a lens element or surface, reference is made to the propagation of the rays of light towards the eye through the ophthalmic lens when an ophthalmic device bearing the ophthalmic lens is worn on a wearer's face. Thus a "front" face is always that which is farthest away to the eye of the user and therefore closest to the field of view and a "rear" face is always that which is closest to the eye of the user.

The terms "upstream" or "downstream" are used in relationship with the propagation light from outside the eye, through the lens element to be worn by the wearer, his pupil towards the retina of the wearer's eye. Thus, a first thing (a surface, a layer, an image etc) is located upstream of a second thing when the light passes through its path towards the retina of the wearer first through the first thing and then through the second thing.

For example an image is located upstream or upfront the retina of the wearer's eye when the image is located in front of the retina between the pupil and the retina.

Conversely, a first thing is located "downstream" of a second thing when the light passes through its path towards the retina of the wearer first through the second element and then through the first element. Thus the retina of the wearer is located downstream of the lens element and the pupil of the wearer.

A cumulative effect of a focus shift is to be understood that optical elements induce at least for some light beams a displacement/reshaping of the focus of the overall lens element upstream the retina of a wearer and nearer/closer to the rear face of the lens element when worn in comparison of the same lens element without optical elements. Such displacement of the focus upstream the retina leads to defocusing/blurring the image in the concerned zones.

A cumulative effect of a counter focus shift is to be understood that optical elements of one set of optical elements induce at least for some light beams a displacement/reshaping of the focus of the overall lens elements in a way to cancel/inverse the focus shift of the optical elements of the other set.

The disclosure relates to a lens element intended to be worn in front of an eye of a wearer.

In the context of the present disclosure, the term "lens element" can refer to a lens blank, an uncut optical lens, a spectacle optical lens edged to fit a specific spectacle frame, an ophthalmic lens or a contact lens.

Figure 1:
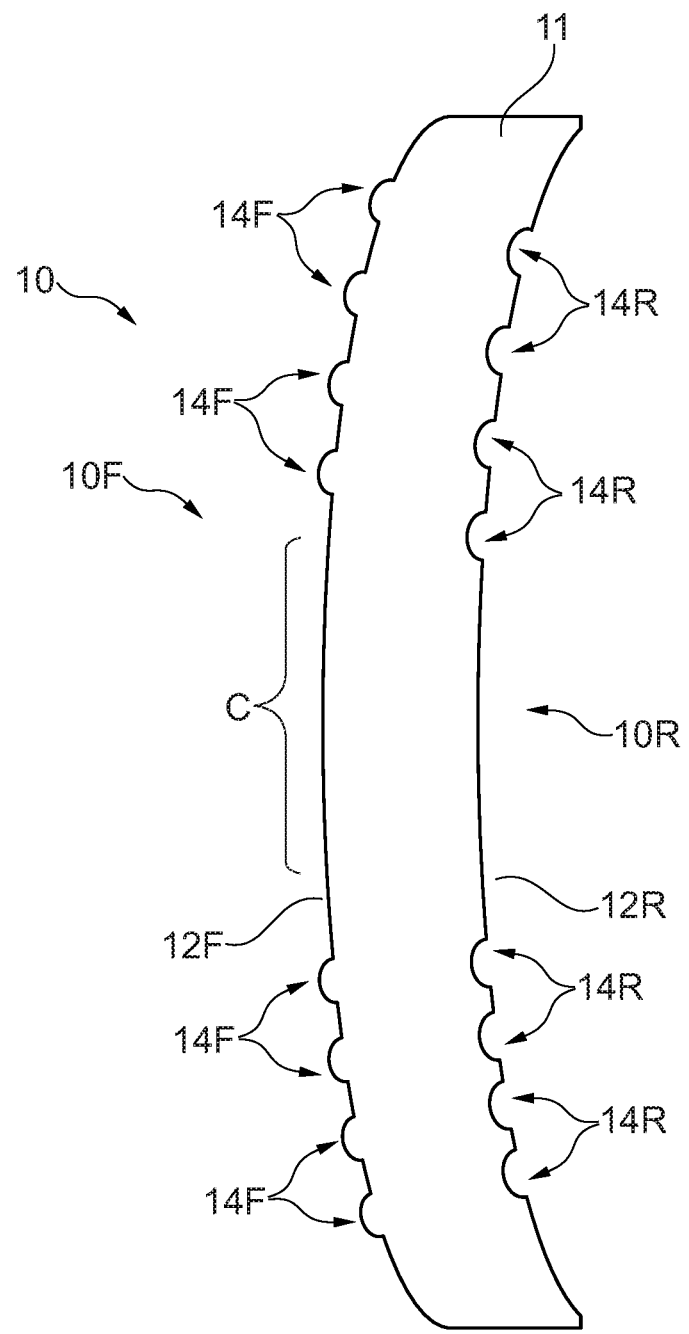
FIG. 1 is a schematic simplified cross sectional view of a lens element according to the present disclosure.

FIG. 1 shows a simplified cross sectional view of an example of a lens element 10 intended to be worn in front of an eye of a wearer according to the disclosure having a front face 10F and a rear face 10R.

Lens element 10 comprises a substrate 11 with a front refraction area 12F and a rear refraction area 12R. Both refraction areas 12F and 12R have respectively a refractive power based on a prescription of an eye of a wearer.

The aim of the refractive power of the refraction areas 12F and 12R based on a prescription of an eye of the wearer is to form a sharp or at least sharper image (in comparison without lens element 10) on the retina of the wearer. Parallel incoming light beams, would be focused on the retina and this would be the case for foveal and peripheral zones of the retina.

The lens element 10 further comprises on its front face 10F a first set of optical elements 14F and on its rear face 10R a second set of optical elements 14R providing respectively a first and a second optical function.

Optical elements 14F and 14R are located for example on at least part of the respective refraction areas 12F and 12R.

In other embodiments the optical elements of the first set 14F and/or the optical elements of the second set 14R may be embedded or integrated in a layer of a multilayer substrate, for example when the substrate comprises several layers.

The optical elements of the first set 14F or the second set 14R can be part of a specific optical layer of the substrate 11.

In the context of the present disclosure, an optical element 14F/or 14R can be considered as an optical structure which provides, with respect to the front refraction area 12F and/or rear refraction area 12R an optical wavefront modification on its intensity, curvature, or light deviation. Such optical elements 14F or 14R may have a physical extension Z (deformation/height) between in particular [0.1 µm-50 µm]. Concerning the physical extension X/Y (width/length/diameter) it may be comprised between [0.5 µm, 2.5 mm] in at least one direction. Optical elements 14F or 14R may have a shape of a droplet (in recess or protrusion) or an annular or ring shape or according to an arc of a circle. In case of an annular, ring or arc of circle shaped optical element 14F or 14R, the cross section of the ring or arc of circle may be comprised between [0.5 µm, 2.5 mm].

A hard coat layer may protect the lens element 10 and cover the optical elements 14F and/or 14R and the refraction areas 12F and/or 12R.

The optical elements 14F and/or 14R can be absorptive or not. In case they are absorptive, they may be absorptive locally up to 100%.

The optical elements 14F and/or 14R can also be configured to scatter or diffract light, in particular with a scattering or diffraction angle ranging from +/−1° to +/−30°.

The substrate 11 is for example made of a plastic material, for instance a polymer substrate like a thermoset, in particular made of poly(urea-urethane), or thermoplastic plastic material, in particular made of polyamide (PA), like nylon or a polycarbonate, or polyester.

The optical elements of the first and/or the second set 14F/14R may be made of the same material as the substrate 11 and have therefore the same refractive index.

In other examples, in particular when embedded, the optical elements of the first set and/or the second set 14F/14R may be made with a different material having a refractive index different from the refractive material forming the substrate 11.

In the example of FIG. 1, the optical elements of the first set 14F are for example protruding from the front face 10F and can be considered as a plurality of respectively independent island-shaped areas. The optical elements of the second set 14R are for example in recess from the rear face 10R. They can also be considered as a plurality of respectively independent island-shaped areas.

In other non-shown examples, the optical elements of the first set 14F and/or the optical elements of the second set 14R can be of
ring or annular shape,
protruding or in recess,
continuous or not.

The refractive areas 12F and 12R are preferably formed as the area other than the areas formed by the plurality of optical elements of the first set 14F and the second set 14R. In other words, the refractive areas 12F and 12R are the complementary areas to the areas occupied by the plurality of optical elements of the first set 14F and the second set 14R.

In particular in the embodiment of FIG. 1, the lens element 10 presents a central area C which is free of optical elements 14F or 14R.

The refraction areas 12F and 12R are configured to provide to the wearer in standard wearing conditions, in particular for foveal vision, a first optical power based on the prescription of the wearer for correcting an abnormal refraction of said eye of the wearer. The object of the refraction areas 12F and 12R is to focus incoming parallel light on the retina.

The wearing conditions are to be understood as the position of the lens element 10 with relation to the eye of a wearer, for example defined by a pantoscopic angle, a Cornea to lens distance, a Pupil-cornea distance, a centre of rotation of the eye Q' to pupil distance.

As will be explained beneath more in detail with respect to FIG. 3, at least some of the optical elements 14F, 14R of the first set and the second set are disposed in a mutual relationship in such a way that, at least some optical elements 14R of the second set are disposed with respect to the optical elements 14F of the first set of the lens element to provide according to a respective first and a second gaze direction on different zones of the retina of the eye of the wearer distinct cumulative optical effects:
contribution to a focus shift of transmitted light on peripheral zones of the retina of the eye of the wearer according to a first gaze direction, and
at least partly or completely counter focus shift a focus shift induced by the first optical function of the optical elements 14F of the first set in the central zone of the retina of the wearer according to a second gaze direction different from the first gaze direction.

Stated in a simplified way, at least some of the optical elements 14R of the second set are disposed in a way to enhance on the one hand myopia control by contributing to not focusing/blurring of transmitted light according to a first gaze direction and on the other hand to "neutralize", at least partly, the first optical function of the first set of optical elements 14F according to a second gaze direction.

Thus, the wearer will benefit at the first gaze direction from high myopia or hyperopia control by defocusing in peripheral zones of the retina and at a second gaze direction from an optimized vision correction for the central zone of the retina.

In addition, at least some of the optical elements 14R of the second set may be configured to change the gradient law of associated optical elements 14F of the first set in function of lens eccentricity.

For light beams which only pass through either the optical elements 14F of the first set or the optical elements 14R of the second set, an individual optical function is achieved.

The individual first and second optical functions of respective first 14F and second 14R sets of optical elements may be the same or may be different.

The individual optical functions of respective first 14F and/or second 14R sets of optical elements may be also a focus shift leading to leading to not focusing/blurring at least partly an image on the retina of the eye of the wearer in order to produce non-focalised light, for example in front of the retina and in particular in peripheral zones of the retina in order to slow down myopia.

Other individual optical functions along a non-limited list may comprise specific local power correction, astigmatism correction, aspherization or prism to orientate differently optical rays.

Figure 2:
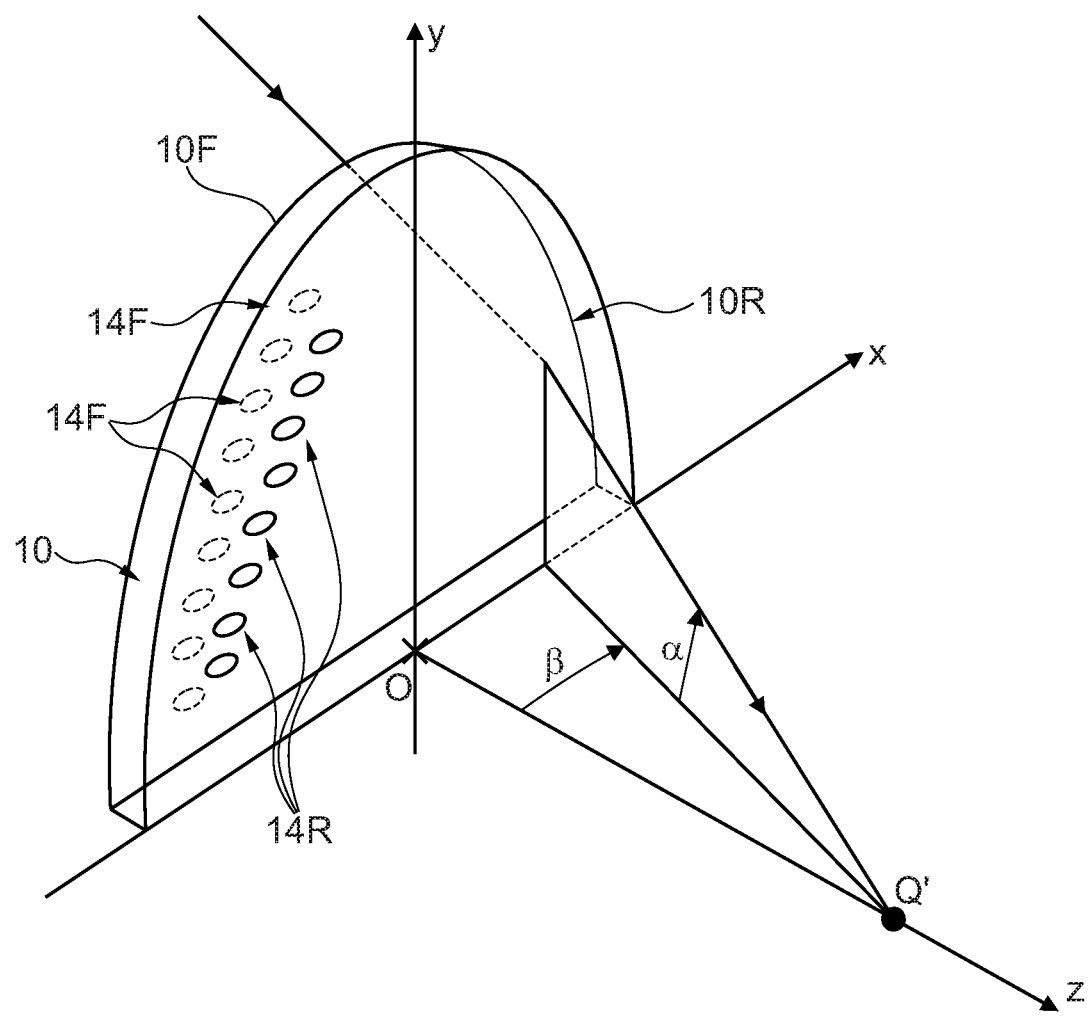
FIGS. 2, 3A and 3B show, diagrammatically, optical systems of eye and lens element.
Figure 3A:
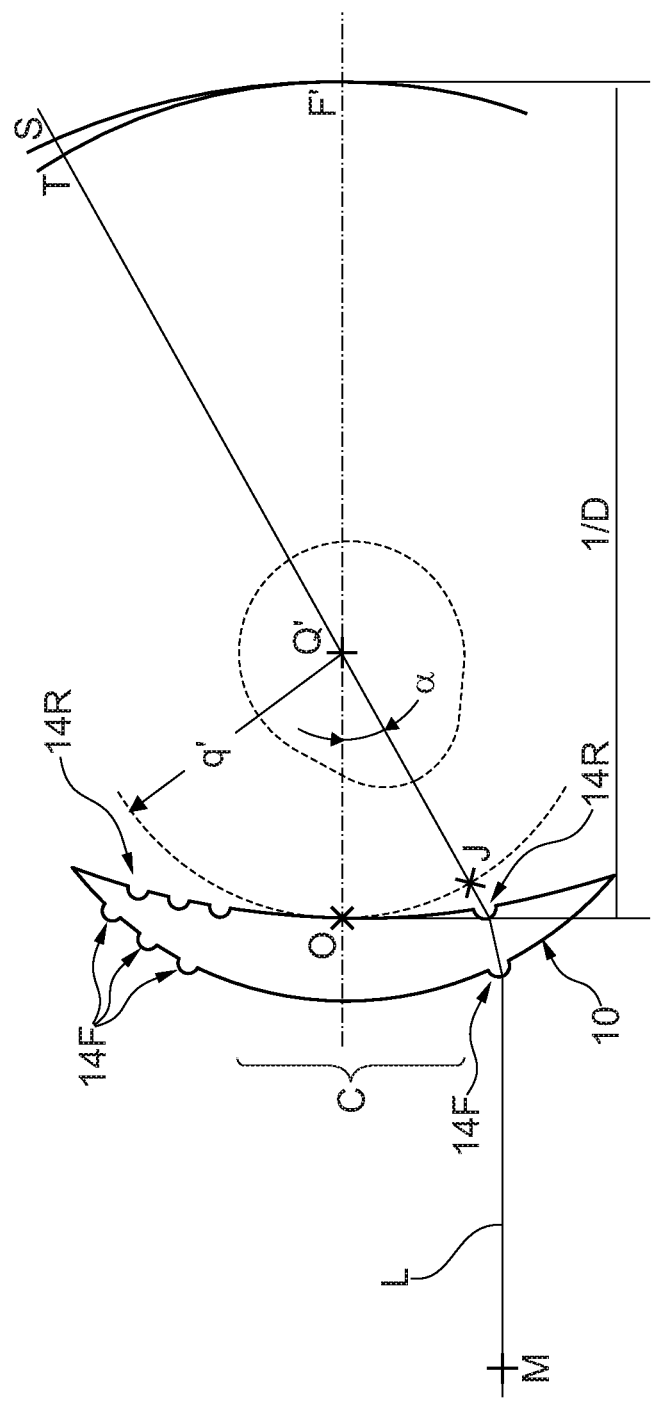
Figure 3B:
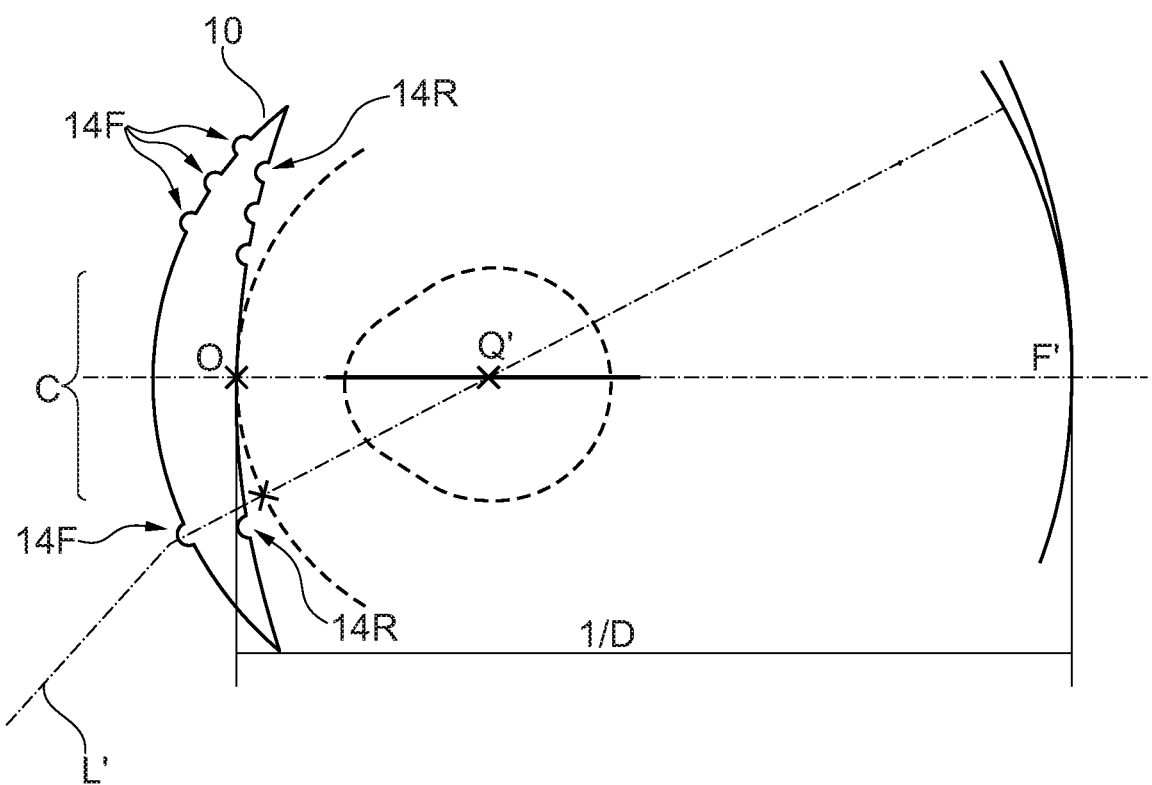

Turning now to FIGS. 2, 3A and 3B which are diagrammatic illustrations of optical systems of eye and lens element 10, thus showing the definitions used in the present disclosure.

For sake of clarity, only some optical elements of the first set 14F located on the front face 10F are represented by hashed line contour and only some optical elements of the second set 14R located on the rear face 10R are represented by solid line contour. The same applies to FIGS. 3A and 3B where only some optical elements 14F of the first set and some optical elements of the second set 14R are represented.

More precisely, FIG. 2 represents a perspective view of such a system illustrating parameters α and β used to define a gaze direction. FIGS. 3A and 3B present a view in the vertical plane parallel to the anteroposterior axis of the wearer's head and passing through the centre of rotation of the eye in the case when the parameter β is equal to 0.

The centre of rotation of the eye is labelled Q'. The axis Q'F', shown on FIG. 3A in a dot-dash line, is the horizontal axis passing through the centre of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear face 10R.

An apex sphere of centre Q', and of radius q', is tangential to the rear face 10R of the lens element 10 in a point of the horizontal axis. As examples, a value of radius q' of 25.5 mm corresponds to a usual value and provides satisfying results when wearing the lenses.

A given gaze direction—represented by a solid line on FIG. 2—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 2. The angle α is the angle formed between the axis Q'J and the projection of the straight line Q'J on the horizontal plane comprising the axis Q'F'; this angle appears on the scheme on FIGS. 2 and 3A. A given gaze direction thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Typically, in far vision following the primary gaze direction, the object point is at infinity. In near vision, as represented in FIG. 3A, following a gaze direction essentially corresponding to an angle α of the order of 35° and to an angle β of the order of 5° in absolute value toward the nasal side, the object distance is of the order of 30 to 50 cm.

Having explained this, one can clearly understand from FIG. 3A, that when worn by a wearer, the optical elements 14F of the first set are disposed at a first range of distances with respect of the centre of rotation of the eye Q' and the optical elements 14R of the second set are disposed at a second range of distances with respect of the centre of rotation Q' of the eye which is different from the first range of distances, in particular as shown in FIG. 3, the first range of distances is farer away from the centre of rotation Q' of the eye than the second range.

In other words, for a same gaze direction, an optical element 14F of the first set is located at a greater distance from the centre of rotation of the eye Q' than an optical element 14R of the second set.

Furthermore, as shown in the example of FIG. 3A for a certain gaze direction corresponding to near vision, the light ray L traced from image point M traverses first an optical element 14F of the first set and then an optical element 14R of the second set.

In this case for such a gaze direction, at least some of the optical elements 14F of the first set and some of the optical elements 14R of the second set are disposed in a cooperation relationship.

For said incoming light beam L impinging in the central zone of the retina of the wearer, the second set of optical elements 14R provides a contribution to at least partly or completely cancel the first optical function of the optical elements 14F of the first set of optical elements. The second set of optical elements 14R induces a counter focus shift that inverses/neutralizes, at least partly, a focus shift induced by the optical elements 14F of the first set.

This is achieved by an at least partly or completely inversion of the first optical function of the optical elements 14F of the first set in the central zone of the retina of the wearer according to a this gaze direction which corresponds to near vision.

Such cooperation of the optical elements 14F and 14R for a near vision gaze direction can for example improve near vision in this situation.

In FIG. 3B is shown a configuration where the gaze direction corresponds to far vision with gaze angles equal or close to zero.

A stated above, the centre area C is free of optical elements 14F and 14R. Thus, for far vision, the vision correction operated by the lens elements 10 corresponds to those provided by the refraction areas 12F and 12R and corresponds to optical power based on the prescription of the wearer for correcting an abnormal refraction of said eye of the wearer. Parallel incident light in the centre area C is therefore focused by the refraction areas 12F and 12R on the foveal or centre zone of the retina.

However incident light beam L' (dot-dot-hash line) passes for example eccentrically through optical elements 14F and 14R and impinges a peripheral zone of the retina of the wearer. In this case, light beam L' is not focused and the first optical function, in particular of a focus shift, of the optical elements 14F of the first set is enhanced.

According to a specific example, the second set 14R of optical elements is disposed in a zone of the lens elements dedicated for near vision.

Figure 4:
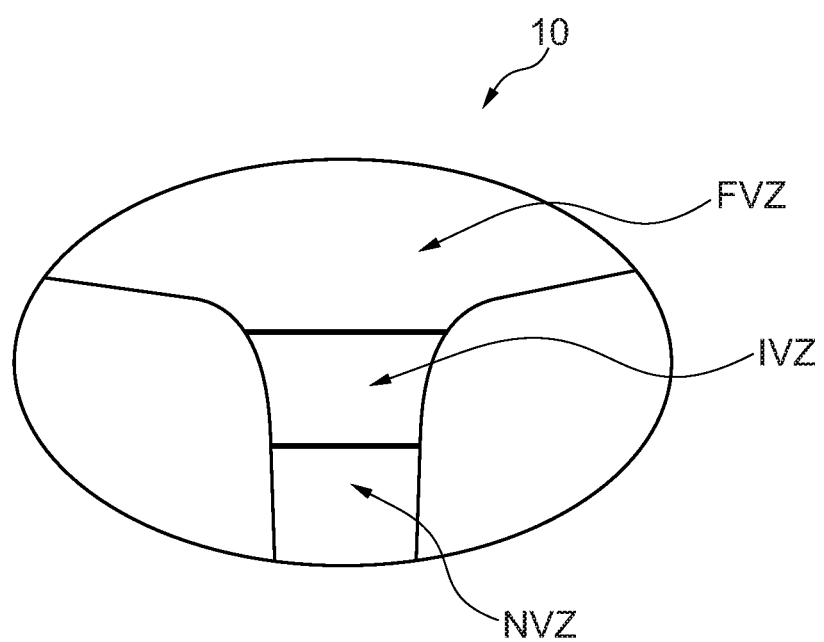
FIG. 4 shows a lens element having different optical correction zones.

As shown in FIG. 4, the lens element 10 comprises for example a near vision zone NVZ, an intermediate vision zone IVZ and a far vision zone FVZ for example for progressive lenses. Thus in some cases, the optical elements 14R of the second set are only disposed in the near vision zone NVZ.

At the same time, for example when in far vision conditions following the primary gaze direction, the object point is at infinity. In this case, image point M can be considered to be part of the peripheral view.

In this case, at least certain optical elements 14R of the secondary set provide an at least partly a focus shift.

This means for example that for far vision, the not focusing or blurring function obtained by a focus shift upfront the retina of the first and the second set for peripheral view is even enhanced by cooperation of the optical elements 14F and 14R in order to produce non-focalised light, for example in front of the retina and in particular in peripheral zones in order to slow down myopia.

A preferred first gaze direction is for example between a gaze angle of +/−10° corresponding to far vision (as depicted in FIG. 3B for example), and preferred second gaze direction is for example comprised between a gaze angle ⟨ of −40° and −20° corresponding to near vision (as depicted in FIG. 3A for example).

A lens element 10 as presented on the figures may be manufactured in various ways in particular by moulding and/or machining and polishing a substrate 11 or a lens blank.

In order to achieve a personalized configuration for a wearer, the eye geometry is measured (for example eye centre of rotation, pupil position and retina shape). In taking for example into account the specificities of the wearers eye, a lens blank having a front refraction area 12F and a rear refraction area 12R cooperating to achieve a refractive power based on a prescription for said eye of the wearer and presenting optical elements 14F, the positions of the second set of optical elements 14R can be determined in a personalized manner with respect to the centre of rotation of the eye Q' of a wearer, by using for example optical ray tracing methods, in order to achieve above described contribution to a not focusing function of transmitted light on peripheral zones of the retina of the eye of the wearer according to a first gaze direction, and at least partly or completely inversion of the not focusing function of the optical elements 14F of the first set in the central zone of the retina of the wearer according to a second gaze direction different from the first gaze direction.

Figure 5:
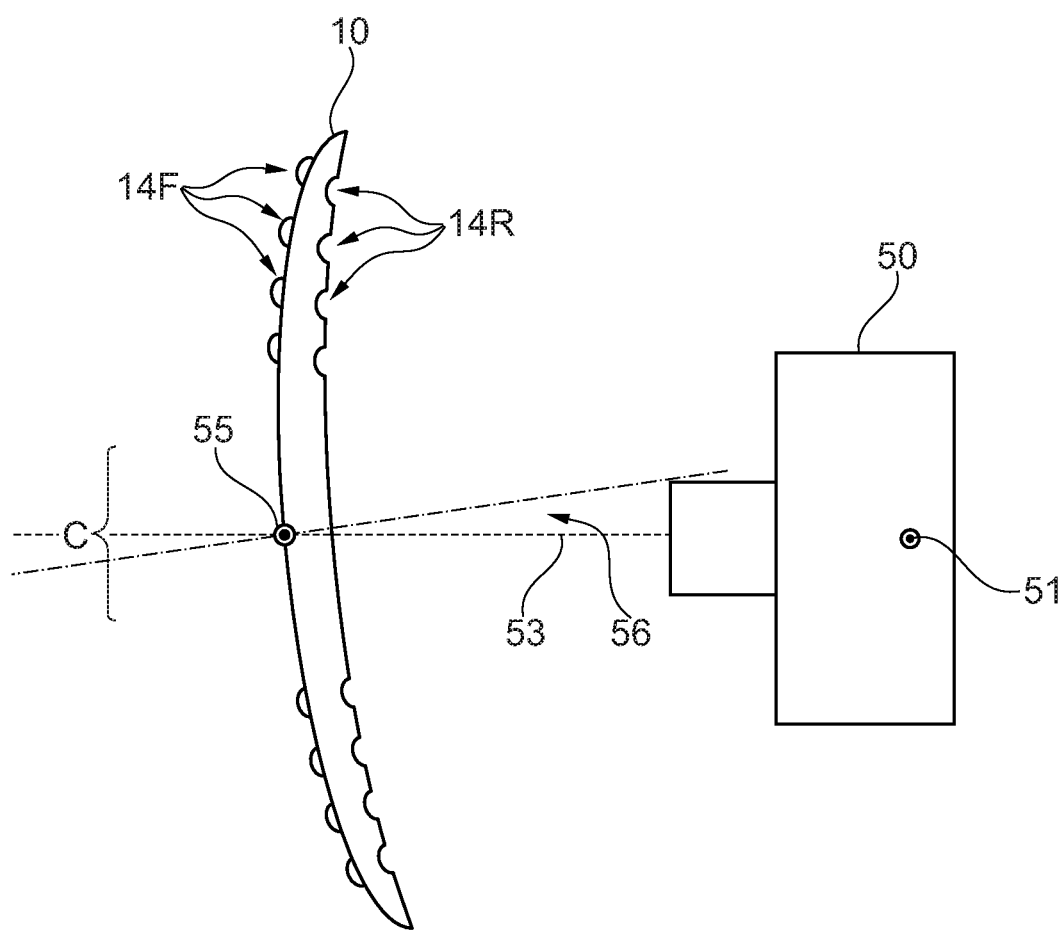
FIGS. 5 and 6 are schematic views of a possible experimental set-up allowing to check cooperation properties of optical elements of a lens element.
Figure 6:
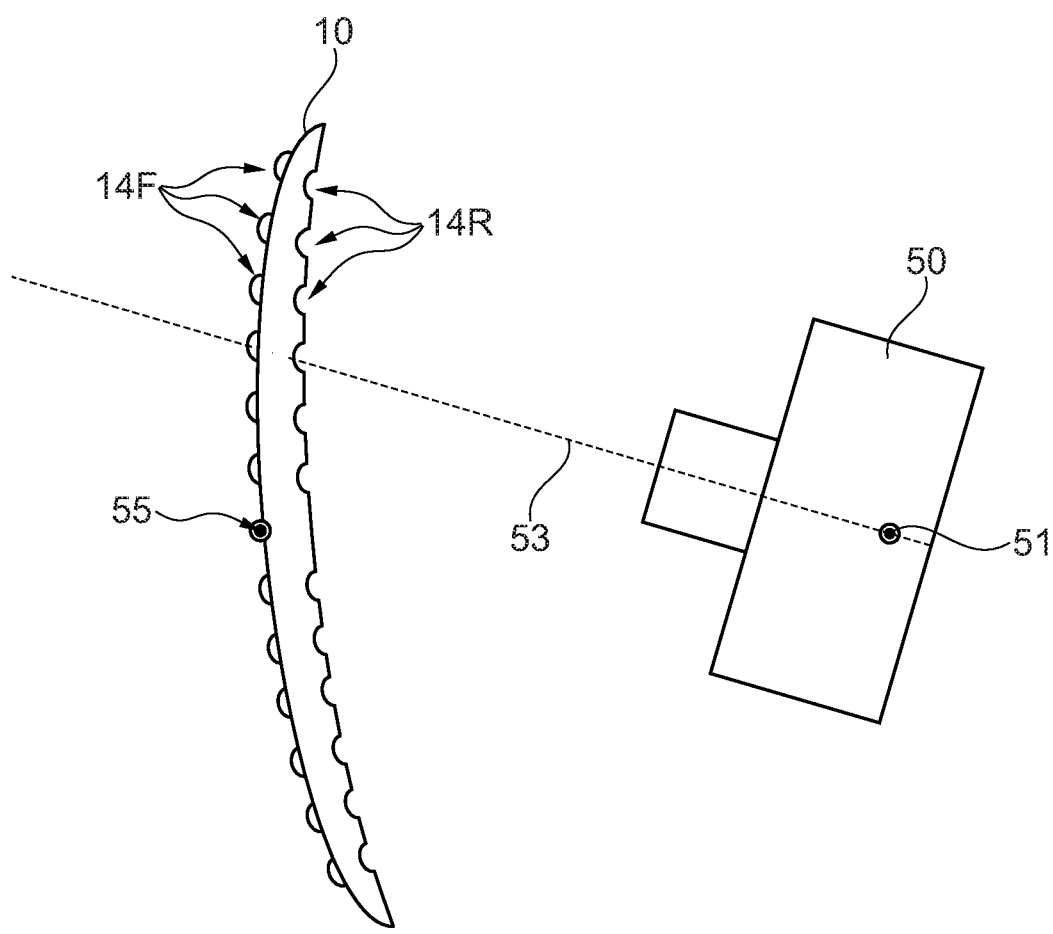

FIGS. 5 and 6 show a schematic experimental set-up allowing to establish that for certain gaze directions (in FIG. 5 for far vision and in FIG. 6 for near vision for example), optical elements 14F of the first set and optical elements 14R of a second set are disposed with respect to each other to provide enhanced optical functions or to cancel at least partly their optical functions.

In a specific example as explained above, optical elements 14F of the first set and optical elements 14R of the second set have opposite optical power. For far vision as shown in FIG. 5, optical elements 14F and 14R are perceived offset for peripheral vision by wearer, so that they do not compensate and provide high and enhanced anti-myopic signal.

For near vision as shown in FIG. 6, optical elements 14F of the first set and optical elements 14R of the second set are perceived for central vision superimposed and so compensate optical power to perfectly clear central vision for near vision conditions.

In addition to lens element 10 as already described above, FIGS. 5 and 6 show a rotatable camera 50.

The camera's aperture is positioned similarly as would be positioned the eye pupil: the distance between the back lens surface and the aperture is close to the expected distance, for instance 14 mm that is average distance.

The camera 50 can be rotated and the rotation centre 51 of the camera shall be similar to the eye rotation centre Q'.

For instance, the rotation centre-lens back surface distance is close to 27 mm (average distance), or the distance between the aperture/rotation centre is close to 13 mm.

The reference (0°) viewing direction is defined as the angle position of the camera 50 when the camera optical axis 53 goes through the lens optical centre 55.

Other viewing directions are defined from this reference, taking horizontal/vertical directions as horizontal/vertical angle rotation from this reference.

The lens element 10 is positioned such that when the camera 50 adopts the reference viewing direction. The lens element 10 has an expected pantoscopic angle 56 and wrap angle as it would have when mounted on eyewear. Taking average value, one can approximate pantoscopic angle 10° and wrap angle 5° (average value).

When the lens element 10 and the camera 50 have been positioned accordingly, the cooperation between optical elements 14F and 14R at certain gaze directions may be realized in the following way:
  selection of at least one viewing direction via the rotation of the camera 50,
  capturing of an image from the camera 50,
  determination in order to establish that
  a) at a first gaze direction for example for far vision (FIG. 5), certain optical elements 14F and 14R are shifted, fully or partially for peripheral vision for showing that the optical elements 14R contribute to focus shift of transmitted light on peripheral zones of the retina of the eye of the wearer according to a first gaze direction,
  b) at a second gaze direction for example for near vision (FIG. 6), certain optical elements 14F and 14R are superimposed, at least partly or fully for showing that the optical elements 14R through a counter focus shift at least partly or completely inverse the first optical function of the optical elements 14F of the first set in the central zone of the retina of the wearer according to this second gaze direction which is different from the first gaze direction.

In FIG. 5, camera 50 is positioned at reference (0°) viewing direction and in FIG. 6, camera 50 positioned at other (non-zero) viewing direction, 18° in the present case.

As can be seen in FIG. 6, the optical elements 14F and 14R are well superimposed in the camera optical axis direction (dashed line 53), corresponding to viewing direction.

For example in case refractions areas 12F and 12R of lens element 10 provide a vision correction of −4.0 diopter, for both gaze directions shown respectively in FIGS. 5 and 6, the central vision would correspond to the −4.0 diopter vision correction while for peripheral vision in particular for far vision, the peripheral part of the image would not be focused on the retina and the second set of optical elements 14R contributes and enhances myopia or hyperopia control.

One therefore understands that the use of first and second sets of optical elements 14F and 14R allows to extend functionalities of the lens element 10 in particular of specific cooperation of optical elements 14F of the first set with optical elements 14R of the second set at certain gaze directions.

In particular, one might foresee an optimized manufacturing process with "standard" semi-finished lens with a first set of optical elements 14F and customized realization of a second set of optical element 14R which is adapted to a specific wearer in order to obtain specific myopia or hyperopia control.

For this case, the wearer's eye geometry can be measured precisely (eye centre of rotation, pupil position and retina shape) and taken into account by simulation to realize the customized second set of optical elements 14R.

The invention claimed is:

1. A lens element intended to be worn in front of an eye of a wearer comprising:
  at least a first and a second set of optical elements providing respectively a first and a second optical function,
  wherein when worn by a wearer, an optical element of the first set is located at a greater distance from the center of rotation of the eye than an optical element of the second set,
  wherein at least some optical elements of the second set are disposed with respect to the optical elements of the first set of the lens element to provide according to a respective first and a second gaze direction on different zones of a retina of the eye of the wearer distinct cumulative optical effects,
  contribution to a focus shift of transmitted light on peripheral zones of the retina of the eye of the wearer according to a first gaze direction, the first gaze direction presents a gaze angle comprised between +/−10° corresponding to far vision, and
  at least partly or completely counter focus shift a focus shift induced by the first optical function of the optical elements of the first set in a central zone of the retina of the wearer according to a second gaze direction different from the first gaze direction, the second gaze direction presents a gaze angle comprised between −40° and −20° corresponding to near vision, positions of the second set of optical elements being determined with respect to the center of rotation of the eye of a wearer.

2. The lens element according to claim 1, wherein the lens element comprises a front refraction area and a rear refraction area cooperating to achieve a refractive power based on a prescription for said eye of the wearer.

3. The lens element according to claim 1, wherein the optical elements of the first set are disposed on a front face of the lens element.

4. The lens element according to claim 1, wherein the optical elements of the second set are disposed on a rear face of the lens element.

5. The lens element according to claim 1, wherein the optical elements of either the first or second set, or both are integrated in an intermediate layer of the lens element.

6. The lens element according to claim 5, wherein the optical elements of the first set are in recess with regard to a front refraction area.

7. The lens element according to claim 5, wherein the optical elements of the second set are in recess with regard to a rear refraction area.

8. The lens element according to claim 2, wherein the optical elements of the first set are in protrusion with regard to the front refraction area.

9. The lens element according to claim 2, wherein the optical elements of the second set are in protrusion with regard to the rear refraction area.

10. The lens element according to claim 1, wherein the optical elements of the second set are ring shaped or shaped according an arc of a circle.

11. The lens element according to claim 1, wherein at least some of the optical elements of the second set are configured to change a gradient law of associated optical elements of the first set in function of lens eccentricity.

12. A method for conceiving a lens element intended to be worn by a wearer the lens element including at least a first and a second set of optical elements providing respectively a first and a second optical function, wherein when worn by a wearer, an optical element of the first set is located at a greater distance from the center of rotation of an eye than an optical element of the second set, wherein at least some optical elements of the second set are disposed with respect to the optical elements of the first set of the lens element to provide according to a respective first and a second gaze direction on different zones of a retina of the eye of the wearer distinct cumulative optical effects, contribution to a focus shift of transmitted light on peripheral zones of the retina of the eye of the wearer according to a first gaze direction, the first gaze direction presents a gaze angle comprised between +/−10° corresponding to far vision, and at least partly or completely counter focus shift a focus shift induced by the first optical function of the optical elements of the first set in a central zone of the retina of the wearer according to a second gaze direction different from the first gaze direction, the second gaze direction presents a gaze angle comprised between −40° and −20° corresponding to near vision, positions of the second set of optical elements being determined with respect to the center of rotation of the eye of a wearer, the method comprising, determining the positions of the second set of optical elements with respect to the center of rotation of the eye of a wearer.

* * * * *